US 8,405,539 B2

(12) United States Patent
Saitto et al.

(10) Patent No.: US 8,405,539 B2
(45) Date of Patent: Mar. 26, 2013

(54) TARGET IDENTIFICATION METHOD FOR A SYNTHETIC APERTURE RADAR SYSTEM

(75) Inventors: Antonio Saitto, Rome (IT); Franco Mazzenga, Rome (IT); Lorenzo Ronzitti, Guidonia (IT)

(73) Assignee: Telespazio S.p.A., Rome (IT)

( * ) Notice: Subject to any disclaimer, the term of this patent is extended or adjusted under 35 U.S.C. 154(b) by 565 days.

(21) Appl. No.: 12/305,823

(22) PCT Filed: Jun. 19, 2007

(86) PCT No.: PCT/IB2007/001638
§ 371 (c)(1),
(2), (4) Date: Jul. 6, 2010

(87) PCT Pub. No.: WO2007/148199
PCT Pub. Date: Dec. 27, 2007

(65) Prior Publication Data
US 2010/0277364 A1     Nov. 4, 2010

(30) Foreign Application Priority Data
Jun. 20, 2006 (IT) .............................. TO2006A0453

(51) Int. Cl.
G01S 13/00 (2006.01)
G01S 13/74 (2006.01)
G01S 13/08 (2006.01)
G01S 13/78 (2006.01)

(52) U.S. Cl. ......... 342/25 R; 342/25 A; 342/42; 342/45; 342/51

(58) Field of Classification Search ................ 342/25 R, 342/25 A, 25 B, 25 C, 25 D, 25 E, 25 F, 29–51, 342/118
See application file for complete search history.

(56) References Cited

U.S. PATENT DOCUMENTS

| | | | | |
|---|---|---|---|---|
| 4,291,409 A * | 9/1981 | Weinberg et al. | ............ | 375/347 |
| 4,786,906 A * | 11/1988 | Krogager | ..................... | 342/25 F |
| 5,274,379 A * | 12/1993 | Carbonneau et al. | ........... | 342/45 |
| 5,299,227 A * | 3/1994 | Rose | .............................. | 342/45 |
| 5,424,737 A * | 6/1995 | Lindell | ............................. | 342/5 |
| 5,446,462 A | 8/1995 | Cleveland | | |
| 5,486,830 A * | 1/1996 | Axline et al. | ................... | 342/43 |
| 5,512,899 A * | 4/1996 | Osawa et al. | ................. | 342/25 A |
| 5,726,630 A * | 3/1998 | Marsh et al. | ................. | 340/10.2 |
| 5,767,802 A * | 6/1998 | Kosowsky et al. | ............. | 342/45 |
| 5,818,383 A * | 10/1998 | Stockburger et al. | ........ | 342/109 |
| 5,821,895 A * | 10/1998 | Hounam et al. | ............. | 342/25 F |
| 6,027,027 A * | 2/2000 | Smithgall | ..................... | 235/488 |
| 6,476,756 B2 * | 11/2002 | Landt | ............................. | 342/42 |
| 6,509,836 B1 * | 1/2003 | Ingram | ..................... | 340/572.4 |
| 6,577,266 B1 * | 6/2003 | Axline | ........................... | 342/42 |
| 6,580,358 B1 * | 6/2003 | Nysen | .......................... | 340/10.41 |
| 6,611,224 B1 * | 8/2003 | Nysen et al. | .................... | 342/42 |
| 6,838,989 B1 * | 1/2005 | Mays et al. | ................. | 340/572.1 |
| 6,842,106 B2 * | 1/2005 | Hughes et al. | ................. | 340/5.8 |
| 6,950,009 B1 * | 9/2005 | Nysen | ........................ | 340/10.41 |

(Continued)

Primary Examiner — Jack W Keith
Assistant Examiner — Peter Bythrow
(74) Attorney, Agent, or Firm — Volpe and Koenig, P.C.

(57) ABSTRACT

In a synthetic aperture radar system monitoring an area containing at least one moving target for identification, the target is equipped with an identification device, which receives the radar signal transmitted by the radar system, and transmits a processed radar signal obtained by modulating the incoming radar signal with a modulating signal containing target information, such as identification and status information, and by amplifying the modulated radar signal; the radar echo signal reflected by the monitored area and containing the processed radar signal is received and processed by a control station of the radar system to locate the target on a map of the monitored area, and to extract the target information to identify the target.

16 Claims, 2 Drawing Sheets

U.S. PATENT DOCUMENTS

| | | | |
|---|---|---|---|
| 6,970,089 B2 * | 11/2005 | Carrender | 340/572.4 |
| 7,460,014 B2 * | 12/2008 | Pettus | 340/572.1 |
| 7,498,940 B2 * | 3/2009 | Pettus | 340/572.1 |
| 7,639,137 B2 * | 12/2009 | Mukherjee | 340/572.1 |
| 2003/0006901 A1 * | 1/2003 | Kim et al. | 340/572.5 |
| 2003/0137446 A1 * | 7/2003 | Vavik | 342/51 |
| 2004/0212494 A1 * | 10/2004 | Stilp | 340/539.1 |
| 2004/0217171 A1 * | 11/2004 | deVos et al. | 235/451 |

* cited by examiner

TARGET IDENTIFICATION METHOD FOR A SYNTHETIC APERTURE RADAR SYSTEM

TECHNICAL FIELD

The present invention relates to a target identification method for a synthetic aperture radar system.

The present invention may be used to particular advantage, though not exclusively, for identifying moving targets in an area monitored by a synthetic aperture radar system comprising at least one movable platform connected by radio to a remote processing station, to which application the following description refers purely by way of example.

BACKGROUND ART

A synthetic aperture radar (SAR) system comprises a radar signal transmitter and receiver operating on a movable platform, such as an aeroplane or satellite; and a remote processing station connected over a radio channel to the movable platform. The transmitter sends a radar signal into a monitored ground or sea area, and the receiver receives the radar echo reflected by the area, and transmits it to the remote processing station, which processes the radar echo to obtain a two-dimensional map of the monitored area.

The transmitted radar signal comprises a succession of microwave-band electromagnetic pulses modulated by linear frequency, or so-called CHIRP, modulation and transmitted at regular time intervals. And the processing station coherently combines the radar echoes corresponding to the transmitted pulses to obtain high-azimuth-resolution maps of extensive areas using relatively small transmitting antennas. CHIRP pulse modulation, on the other hand, provides for achieving high resolution perpendicular to the azimuth direction.

Exceptionally large areas may be covered using a number of satellites or so-called satellite constellation.

Fixed reference points on the maps are located using transponders or so-called "corner reflectors", which are located at the fixed reference points to receive the radar signal and retransmit it transparently, after simply amplifying it. The retransmitted radar signal is usually stronger than the signals reflected by the surrounding environment and constituting the radar echo, so the fixed reference points appear brighter on the constructed map.

The above method, however, is not very effective in identifying a number of fixed and/or moving targets, e.g. ships, vehicles, or people, within the monitored area. That is, though positions (brighter points) can always be detected on the map, the targets corresponding to the detected positions cannot be identified accurately, especially in the case of fast-moving targets.

DISCLOSURE OF INVENTION

It is an object of the present invention to provide a target identification method for a synthetic aperture radar system, and a synthetic aperture radar system implementing such a method, designed to eliminate the aforementioned drawbacks, and which at the same time are cheap and easy to produce.

According to the present invention, there are provided a target identification method for a synthetic aperture radar system, a target identification device for a synthetic aperture radar system, and a synthetic aperture radar system, as claimed in the accompanying Claims.

Basically, the present invention provides for equipping a moving target, within an area monitored by a synthetic aperture radar system, with an identification device, which receives a radar signal transmitted by the radar system, processes the radar signal to assign target information to the radar signal, and transmits the processed radar signal; receiving, by means of the radar system, a radar echo signal comprising the processed radar signal transmitted by the identification device; and processing the radar echo signal, by means of the radar system, to locate the target within the area and extract the target information to identify the target.

BRIEF DESCRIPTION OF THE DRAWINGS

A number of preferred, non-limiting embodiments of the present invention, in which the synthetic aperture radar system employs a satellite, will be described by way of example with reference to the accompanying drawings, in which.

BEST MODE FOR CARRYING OUT THE INVENTION

Figure 1:
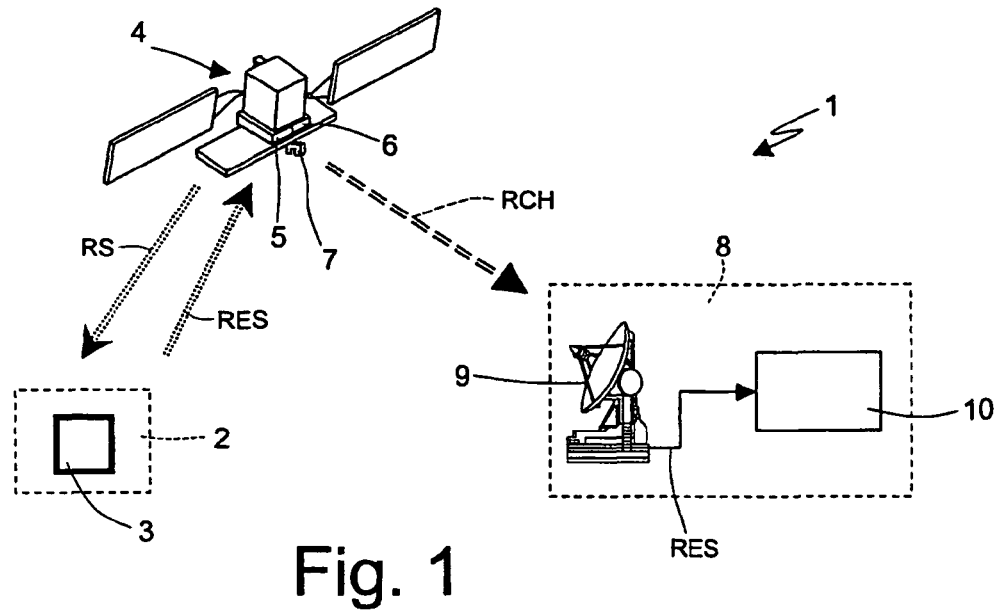
FIG. 1 shows an overall diagram of a synthetic aperture radar system in accordance with the present invention.

Number 1 in FIG. 1 indicates as a whole a synthetic aperture radar system for monitoring a ground or sea area containing at least one moving target 2, such as a vehicle, person, or vessel. Target 2 is equipped with an identification device 3 enabling radar system 1 to locate and identify target 2 in the monitored area, and which, for example, is fitted to the vehicle or vessel, or to a person's clothing.

Radar system 1 comprises a moving platform defined, for example, by a satellite 4, which supports a transmitter 5 for transmitting a known radar signal RS into a monitored area (not shown), a receiver 6 for receiving a radar echo signal RES reflected by the surface of the monitored area, and a radio communication module 7 connected to receiver 6 to transmit radar echo signal RES over a radio channel RCH to a control station 8 of radar system 1. Control station 8 comprises a radio link 9 for receiving radar echo signal RES from satellite 4 over radio channel RCH; and a processing device 10 connected to radio link 9 to numerically process radar echo signal RES.

More specifically, the radar signal RS from transmitter 5 comprises a succession of CHIRP-modulated microwave pulses (not shown) transmitted at given time intervals and of a given radar pulse duration DSAR.

Figure 2:
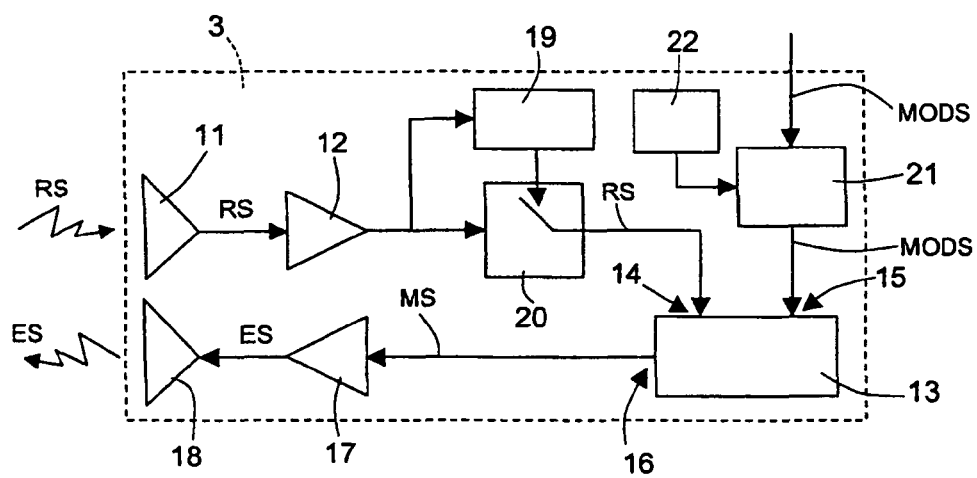
FIG. 2 shows a preferred embodiment of an identification device, in accordance with the present invention, for the FIG. 1 synthetic aperture radar system.

With reference to FIG. 2, identification device 3 comprises a receiving antenna 11 for receiving radar signal RS; a low-noise amplifier (LNA) 12 connected to receiving antenna 11 to amplify the incoming radar signal RS; a modulator 13 having an input 14 for receiving the amplified radar signal RS from low-noise amplifier 12, an input 15 for receiving a modulating signal MODS comprising information relative to target 2, and an output 16 for supplying a modulated signal MS obtained by modulating radar signal RS with modulating signal MODS; an amplifier 17 connected to the output of modulator 13 to supply a processed radar signal ES obtained by amplifying modulated signal MS with a given gain G; and a transmitting antenna 18 connected to amplifier 17 to transmit the processed radar signal ES.

Identification device 3 also comprises a detecting unit 19 connected to receiving antenna 11 to detect the presence of radar signal RS at receiving antenna 11, and to provide a time reference indicating the start of the pulses in radar signal RS; and an activating unit 20 defined, for example, by a switch which, when commanded by detecting 19 detecting the presence of radar signal RS, connects the output of low-noise amplifier 12 to input 14 of modulator 13.

Finally, identification device 3 comprises an encryption unit 21 connected to input 15 to encrypt the information in modulating signal MODS by means of a programmable encryption key; and a memory unit 22 for storing the key.

Figure 3:
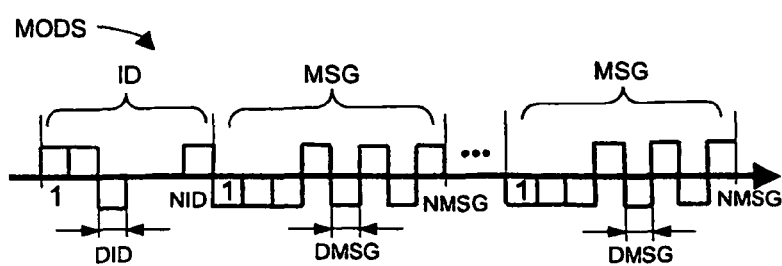
FIG. 3 shows a sequence of messages supplied to the FIG. 2 identification device.

With reference to FIG. 3, modulating signal MODS comprises a sequence of messages, in turn comprising an identification message or code ID unequivocally identifying target 2 and, hence, the identification device 3 of target 2; and one or more status messages MSG following identification message ID and containing information, e.g. target 2 status information, to be sent from target 2 to control station 8.

Identification code ID is coded by a respective sequence of a given number NID of binary digits, each of a given digit duration DID; and each status message MSG is coded by a respective sequence of a given number NMSG of binary digits, each of a given digit duration DMSG normally differing from digit duration DID.

Digit durations DID and DMSG depend, in absolute value, on the radar pulse duration DSAR, i.e. the total duration of the message sequence does not exceed radar pulse duration DSAR. The ratio between digit durations DID and DMSG depends on identification operating requirements, and generally on the number NID of digits required to identify all the tracked targets, and the number NMSG of binary digits required to code status messages MSG. To simplify implementation as far as possible, when no particular operating requirements are involved, digit duration DMSG equals digit duration DID.

Figure 4:
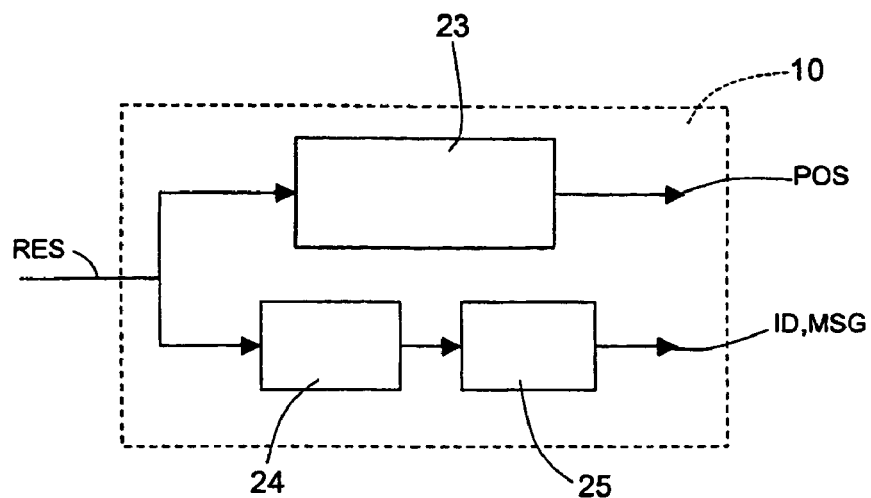
FIG. 4 shows a detail of part of the FIG. 1 synthetic aperture radar system.

With reference to FIG. 4, processing device 10 of control station 8 comprises a known SAR processing unit 23 connected to the output of radio link 9 to process radar echo signal RES to provide a two-dimensional map of the monitored area and locate identification device 3 on the map, i.e. supply position information POS; a demodulating unit 24, also connected to the output of radio link 9 to demodulate radar echo signal RES and extract identification code ID and status message MSG; and a decryption unit 25 connected to the output of demodulating unit 24 to decrypt identification code ID and status message MSG using the same encryption key as identification device 3.

Demodulating unit 24 comprises a number of matched filters (not shown), which operate successively on respective successive portions of radar echo signal RES defined by digit durations DID, DMSG of the binary digits composing the message sequence. More specifically, each filter is matched to a respective portion of modulated signal MS defined by a corresponding binary digit of the message sequence, so the number of matched filters equals the number of binary digits composing the message sequence.

In actual use, when receiving antenna 11 of identification device 3 receives a radar signal RS pulse, detecting unit 19 commands activating unit 20 to connect low-noise amplifier 12 to input 14 of modulator 13 to activate modulation of radar signal RS with modulating signal MODS containing identification code ID and encrypted status messages MSG. The resulting modulated signal MS is amplified by amplifier 17, and the resulting processed radar signal ES is transmitted by transmitting antenna 18.

Satellite 4 receives the radar echo signal RES—which corresponds to the transmitted radar signal RS pulse and comprises the processed radar signal ES transmitted by identification device 3—and transmits radar echo signal RES to control station 8 over radio channel RCH. On receiving radar echo signal RES from radio link 9, SAR processing unit 23 processes radar echo signal RES to locate target 2 on the monitored area map. More specifically, the position of identification device 3, and hence target 2, is shown by a brighter spot on the map, due to the stronger radar echo signal RES produced at that point by identification device 3 transmitting the processed radar signal.

The cascade of demodulating unit 24 and decryption unit 25 operates in parallel with SAR processing unit 23 to identify target 2. More specifically, the matched filters demodulate successive portions of the radar echo signal RES pulse to extract the information contained in corresponding binary digits of identification code ID and status messages MSG transmitted by target 2.

It should be pointed out that, by comprising a number of filters equal to the number of binary digits composing the message sequence, the matched filters as a whole act as a sub-optimum filter matched to the modulating signal MODS.

In a second preferred embodiment not shown, modulating signal MODS comprises a number of successive repetitions of the message sequence. And digit durations DID and DMSG are such that the total duration of the message sequence repetitions does not exceed radar pulse duration DSAR.

Figure 5:
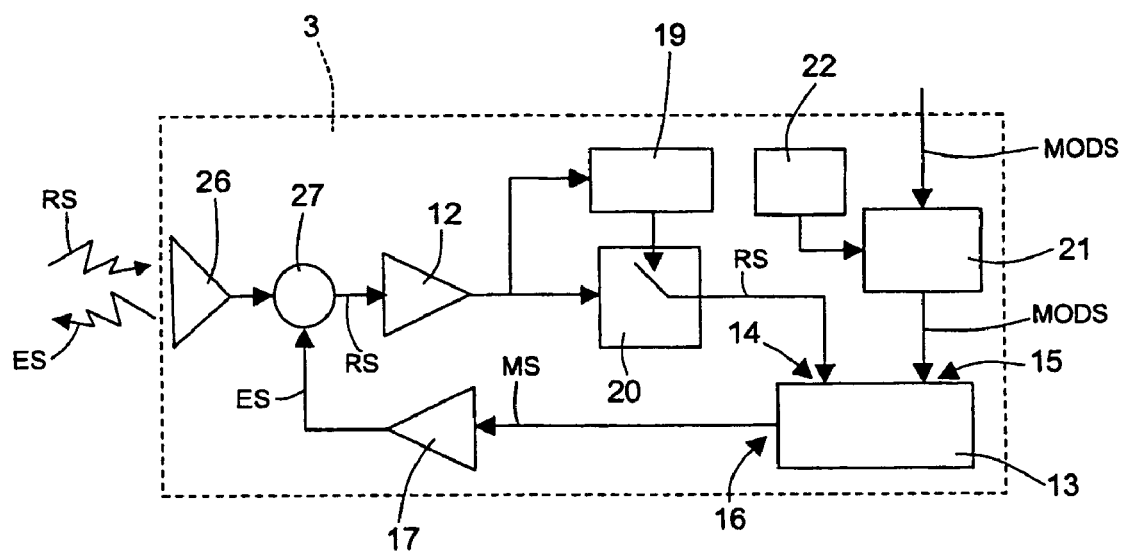
FIG. 5 shows another preferred embodiment of the identification device, according to the present invention, for the FIG. 1 synthetic aperture radar system.

In a third preferred embodiment, radar system 1 comprises at least one identification device 3 as shown in FIG. 5, and which differs from identification device 3 in FIG. 2 by comprising one antenna 26, as opposed to receiving antenna 11 and transmitting antenna 18; and a selection unit 27 for connecting antenna 26 selectively to the input of low-noise amplifier 12 to receive radar signal RS, and to the output of amplifier 17 to transmit processed radar signal ES.

Radar system 1 according to the present invention has the main advantage of even locating and identifying a moving target 2 within the monitored area. Moreover, a number of stationary or moving targets 2 with different identification codes ID can also be located. Finally, radar system 1 as described safeguards against false findings when reconstructing the map, or location of more than one target 2 in the same resolution cell of the map.

The invention claimed is:

1. A method for causing a target (2) to provide respective target information, the method comprising:
    equipping the target (2) with an identification device (3);
    receiving, by the identification device (3), a radar signal (RS) transmitted by a synthetic aperture radar system (1) and comprising at least one radar pulse of a given pulse duration (DSAR);
    processing, by the identification device (3), the incoming radar signal (RS) to obtain a processed radar signal (ES), wherein processing the received radar signal (RS) comprises modulating the received radar signal (RS) with a modulating signal (MODS) including target information comprising an identification code (ID) unequivocally identifying the target (2);
    transmitting the processed radar signal (ES) by the identification device (3);

receiving, by the synthetic aperture radar system (1), a radar echo signal (RES) comprising the processed radar signal (ES); and processing the radar echo signal (RES), by the synthetic aperture radar system (1), to locate the target (2); wherein processing the radio echo signal (RES) comprises demodulating the radar the radio echo signal (RES) to extract therefrom the identification code (ID) to identify the target (2); wherein:

the target information comprises at least one status message (MSG) relative to a status of the target (2);

processing, by the identification device (3), the received radar signal (RS) comprises:

encrypting the target information (ID, MSG) by a programmable encryption key, and modulating the received radar signal (RS) with the modulating signal (MODS) thereby obtaining a modulated signal (MS), said modulating signal (MODS) comprising:

the encrypted identification code (ID) coded by a respective first sequence of a given first number (NID) of binary digits, each of given first duration (DID), and the encrypted at least one status message (MSG), each coded by a respective second sequence of a given second number (NMSG) of binary digits, each of a given second duration (DMSG), wherein said first digit duration (DID) and said second digit duration (DMSG) are such that a total duration of the binary digits coding the encrypted target information (ID, MSG) does not exceed the given pulse duration (DSAR): and processing, by the synthetic aperture radar system (1), the radar echo signal (RES) comprises:

demodulating the radar echo signal (RES) by performing a succession of matched-filter demodulations of respective successive portions of the radar echo signal (RES) defined by the digit durations (DID, DMSG) of all the binary digits coding the encrypted target information (ID, MSG), and decrypting the extracted, encrypted target information (ID, MSG) by said programmable encryption key thereby obtaining the identification code (ID) and the at least one status message (MSG).

2. The method as claimed in claim 1, wherein processing the incoming radar signal (RS) by the identification device (3) comprises:

detecting the presence of the radar signal (RS); and only activating modulation of the received radar signal (RS) in the presence of the radar signal (RS).

3. The method as claimed in claim 1, wherein said second digit duration (DMSG) equals said first digit duration (DID).

4. A target (2) identification device for a synthetic aperture radar system (1), the identification device (3) comprising a receiver (11; 26) for receiving a radar signal (RS) transmitted by the radar system (1); an amplifier (17) for amplifying the incoming radar signal (RS); and a transmitter (18; 26) for transmitting a processed radar signal (ES) supplied by said amplifier (17); the identification device (3) further comprising a signal processor (13, 19, 20, 21, 22) for assigning to the incoming radar signal (RS) target (2) information (ID, MSG) allowing identification of the target (2) by the radar system (1), wherein the identification device (3) is configured to receive a radar signal (RS) transmitted by a synthetic aperture radar system (1) and comprising at least one radar pulse of a given pulse duration (DSAR);

process the incoming radar signal (RS) to obtain a processed radar signal (ES), wherein processing the received radar signal (RS) comprises modulating the received radar (RS) with a modulating signal (MODS) including target information comprising an identification code (ID) unequivocally identifying the target (2); and transmit the processed radar signal (ES), and wherein processing, by the identification device (3), the received radar signal (RS) further comprises:

encrypting the target information (ID, MSG) by a programmable encryption key, and modulating the received radar signal (RS) with the modulating signal (MODS) thereby obtaining a modulated signal (MS), said modulating signal (MODS) comprising:

the encrypted identification code (ID) coded by a respective first sequence of a given first number (NID) of binary digits, each of given first duration (DID), and the encrypted at least one status message (MSG), each coded by a respective second sequence of a given second number (NMSG) of binary digits, each of a given second duration (DMSG), wherein said first digit duration (DID) and said second digit duration (DMSG) are such that a total duration of the binary digits coding the encrypted target information (ID, MSG) does not exceed the given pulse duration (DSAR).

5. The device as claimed in claim 4, wherein said signal processor (13, 19, 20, 21, 22) comprises a modulator (13) for modulating the incoming radar signal (RS) with a modulating signal (MODS) comprising said target (2) information (ID, MSG).

6. The device as claimed in claim 5, wherein said modulator (13) is connected between said receiver (11; 26) and said amplifier (17).

7. The device as claimed in claim 5, wherein said signal processor (13, 19, 20, 21, 22) comprises an encryption unit (21) for encrypting said target (2) information (ID, MSG) by a programmable key; and a memory unit (22) for storing the programmable key.

8. The device as claimed in claim 7, wherein said encryption unit (21) are connected to the input of said modulator (13).

9. The device as claimed in claim 5, wherein said signal processor (13, 19, 20, 21, 22) comprises detecting unit (19) connected to the output of said receiver (11; 26) to detect the presence of the radar signal (RS); and activating unit (20) for connecting the receiver (11; 26) to the input of said modulator (13) when commanded by the detecting unit (19) detecting the presence of the radar signal (RS).

10. The device as claimed in claim 4, wherein said receiver and transmitter (11, 18; 26) comprise an antenna (26); the device comprising a selection unit (27) for connecting the antenna (26) selectively to the input of said signal processor (13, 19, 20, 21, 22) to receive said radar signal (RS), and to the output of said amplifier (17) to transmit said processed radar signal (ES).

11. A synthetic aperture radar system comprising a transmitter (5) for transmitting a radar signal (RS); receiver (6) for receiving a radar echo signal (RES) comprising a processed radar signal (ES) transmitted by an identification device (3) of the type claimed in claim 4; and processor (10) connected to the receiver (6) to process the radar echo signal (RES), and which are configured to process said processed radar signal (ES) to identify said target (2), wherein said synthetic aperture radar system is configured to:

receive a radar echo signal (RES) comprising the processed radar signal (ES); and process the radar echo signal (RES) to locate the target (2); wherein processing the radio echo signal (RES) comprises demodulating the radar the radio echo signal (RES) to extract therefrom the identification code (ID) to identify the target (2) and wherein processing the radar echo signal (RES) further comprises:

demodulating the radar echo signal (RES) by performing a succession of matched-filter demodulations of respective successive portions of the radar echo signal (RES) defined by the digit durations (DID, DMSG) of all the binary digits coding the encrypted target information (ID, MSG), and decrypting the extracted, encrypted target information (ID, MSG) by said programmable encryption key thereby obtaining the identification code (ID) and the at least one status message (MSG).

12. The system as claimed in claim 11, wherein the processor (10) comprises a demodulating unit (24) for demodulating said radar echo signal (RES) to extract said target (2) information (ID, MSG).

13. The system as claimed in claim 11, wherein said processor (10) comprises a decryption unit (25) for decrypting said target (2) information (ID, MSG) by a programmable key.

14. The system as claimed in claim 13, wherein said decryption unit (25) are connected to the output of said demodulating unit (24).

15. The system as claimed in claim 11, wherein said modulating signal (MODS) comprises a sequence of binary digits for coding said target (2) information (ID, MSG); the binary digits having respective digit durations (DID, DMSG); and said demodulating unit (24) comprising a number of matched filters, which operate in succession on respective successive portions of the radar echo signal (RES) defined by the digit durations (DID, DMSG).

16. The system as claimed in claim 15, wherein said modulator (13) supplies a modulated signal (MS); each of said matched filters being matched to a respective portion of the modulated signal (MS) defined by the digit duration (DID, DMSG) of a corresponding said binary digit.

\* \* \* \* \*